United States Patent [19]

Schebler et al.

[11] Patent Number: 4,657,608
[45] Date of Patent: Apr. 14, 1987

[54] LAMINATING APPARATUS AND METHOD

[75] Inventors: Wilbur A. Schebler; Leslie W. Smith; Carl A. Wettering, all of Batesville, Ind.

[73] Assignee: Batesville Casket Company, Inc., Batesville, Ind.

[21] Appl. No.: 790,567

[22] Filed: Oct. 23, 1985

[51] Int. Cl.$^4$ ............................................. B32B 31/00
[52] U.S. Cl. ..................................... 156/64; 156/285; 156/291; 156/364; 156/382; 156/538; 156/116
[58] Field of Search ............... 156/538, 556, 552, 291, 156/548, 295, 267, 578, 362–364, 281, 382, 64; 118/211, 221

[56] References Cited

U.S. PATENT DOCUMENTS

| | | | |
|---|---|---|---|
| 469,583 | 2/1892 | Mooney | 118/221 |
| 2,140,711 | 12/1938 | Mitchell | 156/552 X |
| 3,654,019 | 4/1972 | Cusick | 156/285 |
| 3,909,343 | 9/1975 | Posselt | 156/538 |
| 4,435,246 | 3/1984 | Green | 156/363 X |

*Primary Examiner*—David Simmons
*Attorney, Agent, or Firm*—F. Kristen Koepcke; Brian J. Leitten

[57] ABSTRACT

An apparatus and method for laminating a fabric material to a substrate, and in particular for laminating velvet to a cardboard puffing section to be assembled into a burial casket cap panel dish, without marring or bubbling of the fabric, is disclosed. The fabric material is positioned on a laminating surface and held in place by a vacuum. A substrate is coated with adhesive on a substantial portion of one side and subsequently positioned by a transfer means on top of the fabric and adhered thereto by action of the adhesive and by the uniform vacuum pressure applied to the fabric and the adhesive-laden substrate. As the substrate is passed through the adhesive applicator, it is positioned onto the transfer means. An electric eye senses the trailing edge of the substrate as it passes to the adhesive applicator and after a delayed period, triggers the movement of the transfer means to position the substrate onto the back side of the fabric. After the substrate has been adhered to the fabric, the fabric may be trimmed if necessary and the fabric/substrate laminate removed from the laminating surface. The lamination process is repeated for each new puffing board to be adhered to an additional section of velvet.

7 Claims, 6 Drawing Figures

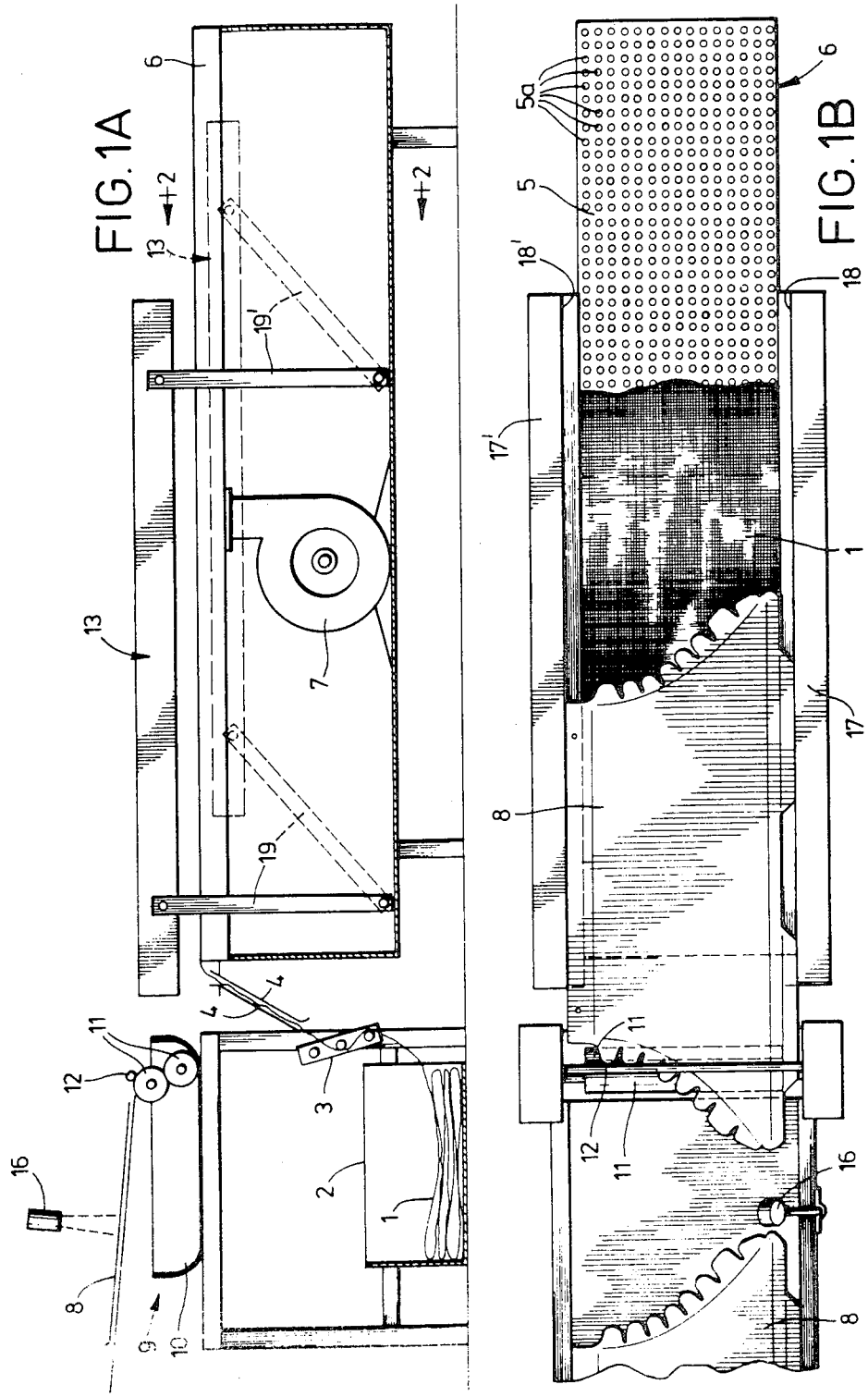

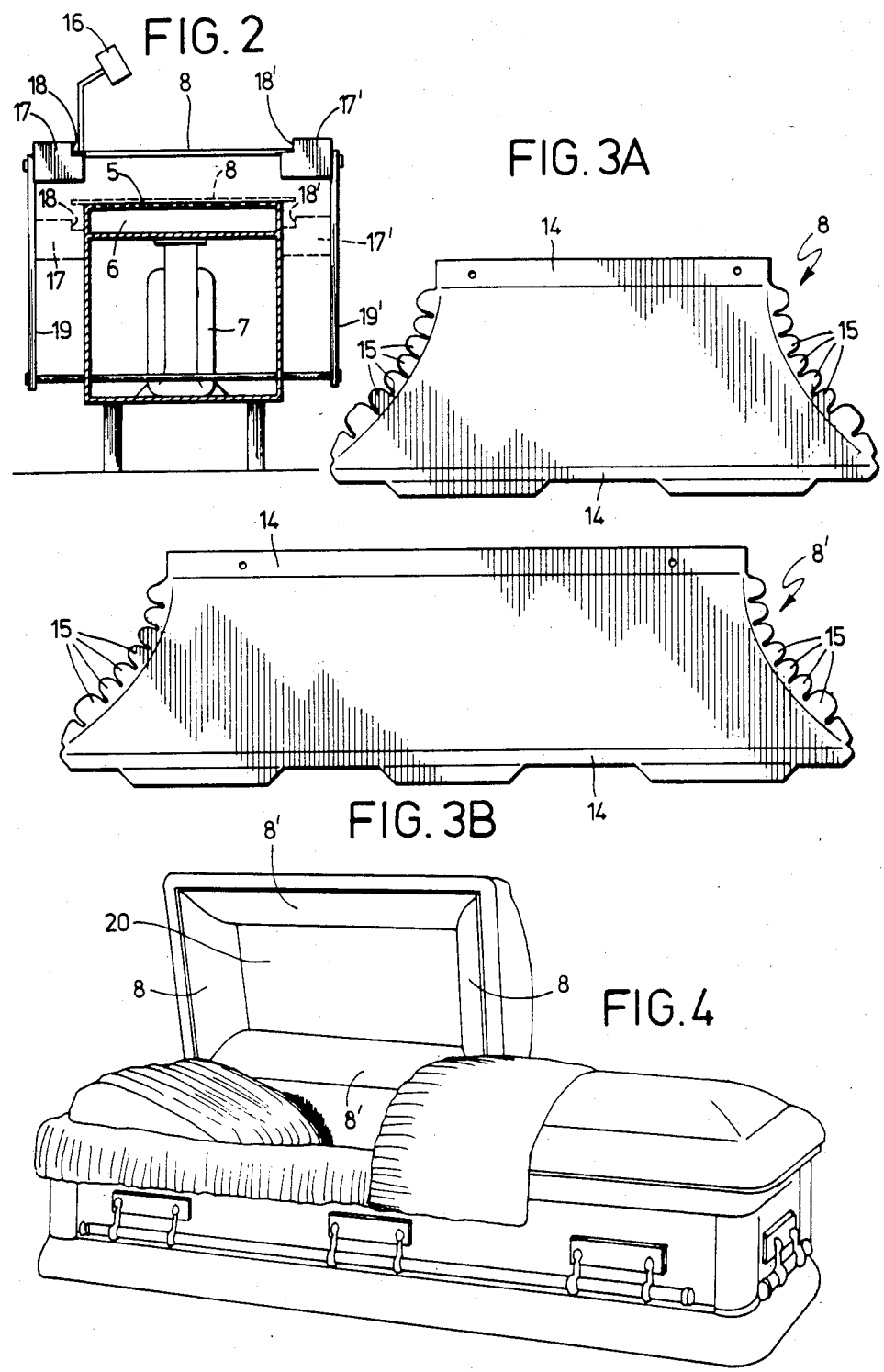

LAMINATING APPARATUS AND METHOD

BACKGROUND AND OBJECTS OF THE INVENTION

The present invention relates to an improved laminating apparatus and method for eliminating bubbling or marring of fabric laminated to a substrate, and in particular to an improved apparatus and method for eliminating bubbles formed in velvet material which is laminated to cardboard material formed in the shape of puffings for use in the interior of caskets.

In the manufacture of the interior portions of a burial casket, it is necessary to construct an inner liner or dish to fit into the hollowed out area of the casket cap. This dish typically comprises a flat bottom portion called a cap panel and side portions commonly referred to as puffing. Typical puffing is manufactured by connecting specifically formed cardboard sections to each other to form the four side sections of the dish. The sections may be attached in any convenient manner, e.g. by the stapling. Prior to assembly of the puffing sections, a covering material or fabric is typically attached thereto. This covering material or fabric, when the puffing sections have been assembled together with the cap panel to form the casket dish, will be exposed to view when the casket cap is in the opened position.

Typically, materials such as velvet or crepe are used as the decorative covering for the puffing sections. Two techniques are generally employed in manufacturing puffing sections, shirring and tailoring. When shirring is employed, folds in the crepe or velvet material are typically present and when the crepe or velvet is adhered to the cardboard puffing, it is difficult to detect any deformities. When tailoring is used, the crepe or velvet is typically adhered to the cardboard puffing in a completely smooth manner. Tailored crepe can withstand pressure application and it is therefore a relatively easy material to work with. Typically, tailored crepe puffings are produced in a continuous process involving pressure laminating the crepe to the cardboard material. Pressure rollers generally eliminate bubbling and marring. Velvet, which is often used in the manufacture of better caskets where quality considerations are paramount, is a complex material to work with and for many years attempts have been made to develop procedures to permit lamination of velvet to cardboard puffing without marring or the formation of bubbles. Use of pressure laminating techniques is not possible since the application of significant pressure to the velvet results in damage and disfiguration thereto.

It is, therefore, an object of the present invention to provide an improved apparatus and method for laminating a fabric material to a substrate without marring or the formation of bubbles in the fabric.

Another object of the present invention is to provide an improved apparatus and method for laminating velvet to casket puffings.

Yet another object of the present invention is to provide an improved apparatus and method which eliminates bubbled velvet puffings when laminating velvet to casket puffings.

SUMMARY OF INVENTION

These and other objects are achieved by the present invention, which is directed to an improved apparatus and method for laminating a fabric material to a substrate without marring or bubbling of the fabric. The fabric material is positioned on a laminating surface and held in place by a vacuum. A substrate is coated with adhesive and subsequently positioned by a transfer means on top of the fabric and adhered thereto. As the substrate is passed through the adhesive applicator, it is positioned onto the transfer means. An electric eye senses the trailing edge of the substrate as it passes to the adhesive applicator and after a delayed period, triggers the movement of the transfer means to position the substrate onto the back side of the fabric. After the substrate has been adhered to the fabric, the fabric may be trimmed if necessary and the fabric/substrate laminate removed from the laminating surface. The lamination process is repeated for each new puffing board to be adhered to an additional section of velvet.

THE DRAWINGS

The objects and advantages of the present invention will become apparent from the following detailed description of the preferred embodiments thereof, in connection with the accompanying drawings in which like numerals designate like elements, and in which:

FIG. 1 A is a side elevational view of the improved apparatus of the present invention.

FIG. 1 B is a top plan view of the improved apparatus of the present invention.

FIG. 2 is a rear elevational view of the improved apparatus of the present invention.

FIG. 3 A is a top plan view of a width section of cardboard puffing employed in the apparatus and method of the present invention.

FIG. 3 B is a top plan view of a length section of cardboard puffing employed in the apparatus and method of the present invention.

FIG. 4 is a perspective view of a burial casket showing the placement of the puffing sections formed by the apparatus and method of the present invention.

DETAILED DESCRIPTION OF THE PREFERRED EMBODIMENTS OF THE INVENTION

In accordance with the present invention, there is provided an improved apparatus and method for laminating a fabric material to a substrate without marring or bubbling of the fabric. Referring to FIG. 1 A, the fabric material 1 to be laminated to the substrate is stored in a material container 2 the material 1 is preferably velvet, but may be any material suitable for laminating to the substrate employed. The material may be an extended length of fabric cut to a desired width and may be fed to the laminating surface by any convenient means, e.g., over guide roller assembly 3 and subsequently through guide plates 4. Alternatively, the material may be placed into position as individual sheets of a size sufficient to receive the substrate. After the material has been fed from material receiving station 2 over the guide roller assembly 3 and through guide plates 4, it is positioned face side down onto laminating surface 5. Laminating surface 5 may be of any desired configuration which permits a vacuum to be applied to laminating surface 5. In the preferred embodiment of the present invention, as shown in FIG. 1B, laminating surface 5 is a flat, horizontal metal plate with a series of holes or perforations 5A therein. In the preferred embodiment, the holes are arranged in spaced - apart parallel lines, as shown in FIG. 1B. Directly beneath laminating surface 5 is a vaccum chamber 6. Attached to vaccum chamber 6 is a vaccum motor or pump 7. When the vacuum is activated, the material to be laminated to the substrate is held in place on the laminating surface by the vacuum formed in vacuum chamber 6.

The substrate to which the fabric material is laminated may be constructed of any desired material. Preferably, the substrate is a cardboard material. In the preferred application of the present invention, cardboard is stamped or cut into the form of a puffing section for eventual assembly and mounting into a casket cap. The puffing configuration is described below in connection with FIGS. 3A and 3B.

Cardboard puffing 8 is transported to an adhesive applicator means 9 where adhesive is applied to a substantial portion of one side of cardboard puffing 8. The adhesive applicator means 9 typically comprises an adhesive trough 10, one or more adhesive applicator rollers 11 and one or more pressure rollers 12. While any suitable adhesive applicator may be employed, the applicator employed in the preferred embodiment of the present invention is a Potdevin Model 2R12, manufactured by Potdevin Machine Company, Teterboro, N.J. As the cardboard puffing 8 passes between and into contact with the uppermost adhesive applicator roller 11, a portion of which extends outside the trough, and pressure roller 12, adhesive is applied to the under surface of cardboard puffing 8.

Any suitable fast-drying adhesive may be employed. Preferably, an adhesive such as Imperial Adhesive LAWQ18 VETRAK or United Resin #51-5360 may be employed.

After cardboard puffing 8 passes though the roller assembly, it is positioned onto or received by transfer means 13. Cardboard puffing 8 rests on a portion of the surface of transfer means 13 (see FIG. 2), and contact between cardboard puffing 8 and transfer means 13 is only made on those portions of the undersurface of cardboard puffing 8 to which adhesive has not been applied. Referring to FIGS. 3A and 3B, the edge tab portions 14 of cardboard puffing 8 and the tab portions 14' of cardboard puffing 8' are not coated with adhesive. After the material has been applied to one side of cardboard puffings 8 and 8', the puffing sections maybe assembled by connecting additional tab portions 15 and 15' to form the assembled casket puffings. The shorter tab portions 14 and 14' of each puffing section 8 or 8' may be attached to a cap panel (e.g., corresponding tabs on a cap panel) to complete construction of the casket dish. Tab portions 14 and 14' and tab portions 15 and 15' may be connected in any convenient manner, preferrably by stapling. When the casket dish is finally assembled in the burial casket, the stapled tab portions are hidden from view.

Sensing means 16 is positioned to sense the presence or absence of a cardboard piece passing to the adhesive applicating means. Preferably, the sensing means is an electric eye which senses the leading and trailing edges of the cardboard puffing. When the electric eye senses that the trailing edge of the cardboard puffing has passed in a direction toward the adhesive applicator, it trigger movement of transfer means 13. A delay signal of any convenient length may be employed. Preferably, a delay sufficient to ensure that the entire cardboard puffing 8 is supported by transfer means 13 is employed.

The detailed construction of transfer means 13 is shown more clearly in FIG. 2. While any convenient transfer means may be employed, the preferred transfer means comprises a pair of transfer bars 17 and 17'. These bars are located beyond the adhesive applicating means in a postion above the laminating surface 5. The bars are parallel to each other and located in a position parallel to the length dimension of the laminating surface, one transfer bar being located above and to either side of the laminating surface. The transfer bars may be of any configuration suitable to permit transfer of the adhesive laden cardboard without transfering adhesive to the transfer means. Preferably, the bars are of a generally rectangular cross section having a notched or recessed ledge section 18 located along the length of the upper edge of each transfer bar 17 directly adjacent to the laminating surface. Notches or recesses 18 and 18' are shown in FIG. 2 and are preferably right-angle notches or recesses. As the adhesive-laden cardboard puffing 8 is passed through the adhesive applicator means 9, the cardboard is moved onto the surface of the notched or recessed portion of the transfer bars 17 and 17'. When the adhesive has been applied along the entire length of the cardboard puffing, a substantial portion of the uncoated tab portions along the edge of the cardboard is supported by the recessed portions of the transfer bar. Once the adhesive-laden cardboard is in position on the pair of transfer bars, the bars are moved in parallel by an air cylinder (not shown) which is triggered by the time-delayed signal from sensing means 16 in a direction away from the adhesive applicator means 9 and down toward the laminating surface 5 (see illustration in FIGS. 1A and 1B), to a first position where the material to be laminated is held in place by the vacuum formed in vacuum chamber 6. This allows the cardboard 8 to be positioned directly on top of and in contact with the material to which it is to be laminated. Contact between the cardboard 8 and the material 1 is made when the horizontal plane of the recesses 18, 18' meets the horizontal plane of the laminating surface 5. The transfer bars continue to pass along each side of the laminating surface 5 to a second position below the plane of the laminating surface.

Once contact has been made between the cardboard 8 and the material 1, additional pressure may be applied if desired to secure the puffing laminate. However, the use of any significant additional pressure is not required with the present invention. The vacuum used to hold the material 1, which is generally porous, in place on the laminating table is also useful to apply a uniform, gentle pressure to the cardboard bringing the adhesive-laden portion into contact with the fabric and permitting a uniform bonding of the cardboard and the fabric to occur. If an extended strip of material 1 is being employed, that material may be cut across its width and at a position behind the trailing edge of the puffing laminate. Once the puffing laminate has been removed from the laminating surface, an additional length of material may be moved into position to receive the next cardboard piece. This process may be carried out on a continuous basis or may be employed to form puffing sections individually.

Again referring to figures 1A and 1B, transfer bars 17 and 17' are supported by two pairs of movable arms 19 and 19'. Preferably, one pair of support arms 19 and 19' are employed to support each of the transfer bars 17 and 17'. The movement of transfer means 13 is accomplished by, e.g., an air cylinder (not shown) which is triggered by the signal from sensing means 16. Once the lamination process has been completed for one cardboard puffing 8, the transfer means 13 is moved back into the original position to receive the next cardboard piece. This may be accomplished, e.g., by employing sensing means 16 to sense the leading edge of the next cardboard piece 8 and send a signal to again trigger the air cylinder, this time to return transfer means 16 to its original position to receive new cardboard piece 8.

Referring to FIG. 4, the puffing sections 8, 8' are shown in an assembled condition and inserted into the cap of a burial casket. The tabbed portions of said puffing sections 8, 8' are not exposed to view and edge portions 14, 14' (also hidden from view and positioned in the interior of the cap) are attached to cap panel 20.

Although the present invention has been described in connection with the preferred embodiments thereof, it will be appreciated by those skilled in the art that additions, modification, substitutions and deletions not specifically described may be made without departing from the spirit and scope of the invention as defined in the impended claims:

What is claimed is:

1. An improved laminating apparatus for eliminating bubbling and marring of fabric material laminated to a substantially non-porous substrate comprising:
   (a) an adhesive applicator means for receiving a substantially non-porous substrate being fed thereto and applying an adhesive coating to said substrate on a substantial portion of one side thereof, leaving the edge portions along the length of said one side of said substrate uncoated;
   (b) means for feeding a fabric material onto a laminating surface;
   (c) transfer means for receiving said substrate from said adhesive applicator and transferring said substrate to said laminating surface whereby the adhesive-coated side of said substrate is placed into contact with said fabric material, said transfer means being capable of supporting said substrate on the uncoated edge portions thereof during receipt and transfer of said substrate, said transfer means comprising a pair of transfer bars, one transfer bar mounted along each length side of said laminating surface and above said laminating surface, said transfer bars being mounted on movable support arms whereby said transfer bars are capable of being moved to a first position for placing the substrate onto the fabric material ont he laminating surface and to a second position below the plane of the laminating surface;
   (d) vacuum means for retaining said fabric material on said laminating surface and for applying a uniform vacuum pressure to said adhesive-coated substantially non-porous substrate and said fabric material to form a uniform, unbubbled fabric/substrate laminate, said vacuum means providing the only force to hold said substrate and said fabric material in contact; and
   (e) means for sensing the leading and trailing edges of said substrate being fed to said adhesive applicator means, said sensing means initiating movement of said transfer means to transfer said substrate to said laminating surface and into contact with said fabric material in response to sensing the trailing edge of said substrate and initiating movement of said transfer means to reposition said transfer means for receiving another substrate to be laminated in response to sensing the leading edge of another substrate to be laminated.

2. An improved laminating apparatus according to claim 1 wherein said adhesive applicator means comprises:
   (a) an adhesive trough for receiving a supply of adhesive;
   (b) at least one adhesive applicator roller suspended in said adhesive trough and having a portion thereof extending outside of said adhesive trough; and
   (c) at least one pressure roller positioned adjacent to the portion of said adhesive applicator roller extending outside of said adhesive trough; whereby substrates to be coated with adhesive are passed between and in contact with said at least one pressure roller and said at least one adhesive applicator roller and receive a coating on a substantial portion of the side of substrate in contact with said at least one adhesive applicator roller.

3. An improved laminating apparatus according to claim 1 wherein said vacuum means comprises a vacuum chamber formed directly below said laminating surface and wherein said laminating surface comprises a generally flat, horizontal surface having a plurality of perforations formed therein.

4. The improved laminating apparatus according to claim 1 wherein each of said transfer bars is of a generally rectangular cross section having a recessed ledge section located along the length of the upper edge of said bar adjacent to said laminating surface.

5. The improved laminating apparatus according to claim 4 wherein said recessed ledge section comprises a right-angle recess.

6. An improved laminating apparatus according to claim 1 wherein said sensing means comprises means for initiating movement of said transfer means to transfer said substrate to said laminating surface in response to sensing the trailing edge of said substrate and after a delay sufficient to ensure that said substrate is completely supported by said transfer means upon initiation of said movement.

7. An improved method of laminating a fabric material to a substantially non-porous substrate without bubbling or marring of the fabric comprising:
   (a) feeding a substantially non-porous substrate to an adhesive applicating station;
   (b) applying adhesive to a substantial portion of one side of said substrate leaving the edge portions along the length of said one side of said substrate uncoated:
   (c) sensing the trailing edge of said substrate as it approaches said adhesive applicating station;
   (d) feeding a fabric material onto a laminating surface;
   (e) applying a vacuum to the side of said fabric material in contact with said laminating surface to retain said fabric material on said laminating surface;
   (f) supporting said substrate on the uncoated edge portions thereof; and
   (g) transferring said substrate onto said fabric material in response to sensing said trailing edge of said substrate whereby the adhesive-coated side of said substrate is placed into contact with said fabric material and laminated thereto by the action of said adhesive and by the application of a uniform vacuum pressure to said substantially non-porous adhesive-coated substrate and said fabric material, said vacuum pressure providing the only force to hold said substrate and said fabric material in contact.

* * * * *